US010961992B2

(12) United States Patent
Saveliev et al.

(10) Patent No.: US 10,961,992 B2
(45) Date of Patent: Mar. 30, 2021

(54) FLUID DISPENSING APPARATUS AND METHOD

(71) Applicant: Pentair Filtration Solutions, LLC, Hanover Park, IL (US)

(72) Inventors: Michael Saveliev, Huntington Beach, CA (US); John Shanahan, White Bear Lake, MN (US); Eric White, Hanover Park, IL (US); Patrick Callaghan, St. Paul, MN (US)

(73) Assignee: Pentair Filtration Solutions, LLC, Hanover Park, IL (US)

( * ) Notice: Subject to any disclaimer, the term of this patent is extended or adjusted under 35 U.S.C. 154(b) by 0 days.

(21) Appl. No.: 16/359,596

(22) Filed: Mar. 20, 2019

(65) Prior Publication Data
US 2019/0219042 A1    Jul. 18, 2019

Related U.S. Application Data

(63) Continuation of application No. 15/197,160, filed on Jun. 29, 2016, now abandoned.
(Continued)

(51) Int. Cl.
*F04B 13/02* (2006.01)
*F04B 23/02* (2006.01)
(Continued)

(52) U.S. Cl.
CPC ............ *F04B 13/02* (2013.01); *B67D 1/0027* (2013.01); *B67D 1/102* (2013.01); *F04B 9/109* (2013.01);
(Continued)

(58) Field of Classification Search
CPC .......... F04B 13/02; F04B 9/115; F04B 9/109; F04B 53/143; F04B 53/162; F04B 17/03;
(Continued)

(56) References Cited

U.S. PATENT DOCUMENTS

| 1,049,478 A | * | 1/1913 | Hedgcock | ............... | G01F 11/04 |
| | | | | | 222/219 |
| 1,152,453 A | | 9/1915 | Thune | | |

(Continued)

FOREIGN PATENT DOCUMENTS

| DE | 4014634 A1 | 6/1997 |
| EP | 0646776 A1 | 4/1995 |

(Continued)

OTHER PUBLICATIONS

Fisher et al. "Clogged Feeding Tubes: A Clinician's Thorn," Practical Gastroenterology, Mar. 2014, pp. 16-22.
(Continued)

*Primary Examiner* — Patrick M. Buechner
*Assistant Examiner* — Randall A Gruby
(74) *Attorney, Agent, or Firm* — Husch Blackwell LLP (57) ABSTRACT

An example apparatus includes a housing including an inlet and an outlet. The example apparatus also includes a rotor defining a bore. The rotor is disposed in the housing. The example apparatus further includes a piston disposed in the bore. A motor is operatively coupled to the rotor to rotate the rotor from a first position to a second position. The bore is to be in fluid communication with the inlet and the outlet when the rotor is in the second position.

20 Claims, 6 Drawing Sheets

Related U.S. Application Data (60) Provisional application No. 62/186,265, filed on Jun. 29, 2015.

(51) Int. Cl.

| | | |
|---|---|---|
| *F04B 19/22* | (2006.01) | |
| *F04B 53/14* | (2006.01) | |
| *F04B 17/03* | (2006.01) | |
| *F04B 49/22* | (2006.01) | |
| *F04B 53/16* | (2006.01) | |
| *F04B 9/109* | (2006.01) | |
| *B67D 1/00* | (2006.01) | |
| *B67D 1/10* | (2006.01) | |
| *F04B 9/115* | (2006.01) | |
| *G01F 11/04* | (2006.01) | |
| *G01F 11/02* | (2006.01) | |

(52) U.S. Cl.
CPC .............. *F04B 9/115* (2013.01); *F04B 17/03* (2013.01); *F04B 19/22* (2013.01); *F04B 23/02* (2013.01); *F04B 49/22* (2013.01); *F04B 53/143* (2013.01); *F04B 53/162* (2013.01); *G01F 11/024* (2013.01); *G01F 11/04* (2013.01)

(58) Field of Classification Search
CPC . F04B 23/02; F04B 49/22; G01F 1/00; B67D 1/0027; B67D 1/102
See application file for complete search history.

(56) References Cited

U.S. PATENT DOCUMENTS

| | | | |
|---|---|---|---|
| 2,042,184 A | 5/1936 | Mccreadie | |
| 2,406,240 A | 8/1946 | Morgenroth | |
| 2,427,680 A | 9/1947 | Leonard | |
| 3,056,356 A | 10/1962 | Piper | |
| 3,167,398 A | 1/1965 | Whittington | |
| 3,294,032 A | 12/1966 | Sundblom | |
| 3,329,319 A | 7/1967 | Isaac | |
| 3,387,748 A | 6/1968 | Brenchley | |
| 3,388,839 A | 6/1968 | Frydenberg | |
| 3,394,850 A | 7/1968 | Volkober | |
| 3,675,820 A | 7/1972 | Newberry | |
| 4,033,482 A | 7/1977 | Kushner et al. | |
| 4,416,397 A | 11/1983 | Brown | |
| 4,573,898 A | 3/1986 | Jones et al. | |
| 4,767,028 A | 8/1988 | Rohlfing et al. | |
| 4,773,565 A | 9/1988 | Rohlfing et al. | |
| 4,930,555 A | 6/1990 | Rudick | |
| 5,244,356 A | 9/1993 | Hasegawa | |
| 5,299,715 A | 4/1994 | Feldman | |
| 5,368,195 A | 11/1994 | Pleet et al. | |
| 5,456,298 A | 10/1995 | Tennis | |
| 5,478,218 A | 12/1995 | Gu | |
| 5,509,575 A | 4/1996 | Gillette | |
| 5,547,110 A | 8/1996 | Keller et al. | |
| 5,850,946 A | 12/1998 | Keller et al. | |
| 5,871,068 A | 2/1999 | Selby | |
| 6,059,148 A | 5/2000 | Keller et al. | |
| 6,173,862 B1 | 1/2001 | Buca et al. | |
| 6,179,583 B1 | 1/2001 | Weston | |
| 6,676,387 B1 | 1/2004 | Penn | |
| 6,702,155 B1 | 3/2004 | Rebne | |
| 7,036,686 B2 | 5/2006 | Newton | |
| 8,672,848 B2 | 3/2014 | Slayton et al. | |
| 8,692,237 B2 | 4/2014 | Kim et al. | |
| 2004/0129720 A1 | 7/2004 | Cheng et al. | |
| 2006/0118581 A1 | 6/2006 | Clark | |
| 2006/0255072 A1 | 11/2006 | Hagin et al. | |
| 2008/0237257 A1 | 10/2008 | Schultz | |
| 2010/0089948 A1* | 4/2010 | Ziesel | B67D 1/0021 222/129.4 |
| 2010/0224649 A1 | 9/2010 | Hoover | |
| 2012/0018454 A1 | 1/2012 | Penn et al. | |
| 2013/0107658 A1 | 5/2013 | Worley et al. | |
| 2014/0255260 A1 | 9/2014 | Dewachter et al. | |
| 2015/0225224 A1 | 8/2015 | Tilton et al. | |

FOREIGN PATENT DOCUMENTS

| | | |
|---|---|---|
| FR | 1086862 A | 2/1955 |
| GB | 309904 A | 7/1929 |

OTHER PUBLICATIONS

International Search Report and Written Opinion for PCT/US16/40115, dated Nov. 16, 2016, 10 pages.

Partial Supplementary European search report issued in corresponding European Application No. 16818696.3, dated Mar. 7, 2019, 21 pages.

\* cited by examiner

FLUID DISPENSING APPARATUS AND METHOD

RELATED APPLICATIONS

This application claims priority to U.S. Provisional Patent Application No. 62/186,265 filed on Jun. 29, 2015, the entire contents of which is incorporated herein by reference.

BACKGROUND

A traditional beverage dispenser such as a soda fountain often dispenses a drink by mixing syrup and carbonated water. A metering device generally controls a first predetermined amount of the syrup mixed with a second predetermined amount of the carbonated water for each drink. However, traditional metering devices often dispense inconsistent amounts of the syrup and the carbonated water, causing inconsistencies in a flavor of the drinks dispensed by the beverage dispenser.

SUMMARY

An example apparatus includes a housing having an inlet and an outlet. The example apparatus also includes a rotor defining a bore and the rotor is disposed in the housing. The example apparatus further includes a piston disposed in the bore. A motor is operatively coupled to the rotor to rotate the rotor from a first position to a second position. The bore is in fluid communication with the inlet and the outlet when the rotor is in the second position.

In some embodiments, a fluid dispensing system is disclosed. The system includes a piston drum having a first bore and a second bore. The first and second bores are each oriented substantially parallel with respect to each other. A first piston is disposed in the first bore and a second piston is disposed in the second bore. The first bore is designed to receive a first fluid and the second bore is designed to receive a second fluid different from the first fluid. A plate is attached to the piston drum and the plate has a first and second aperture that correspond to the first bore and to the second bore, respectively. A motor rotates the piston drum with respect to the plate to dispense both the first and second fluids.

A method of distributing a precise amount of a fluid is also disclosed. A housing is provided that has an inlet conduit and an outlet conduit. A rotor defining a bore is also provided and the rotor disposed in the housing. A piston is disposed in the bore and a motor is coupled to the rotor. The rotor is rotated from a first dispensing position in which a first end of the piston abuts a first stop adjacent the inlet conduit, to a second dispensing position in which the piston abuts a second stop and is adjacent the outlet conduit. A fluid is dispensed from the bore through the outlet conduit.

DETAILED DESCRIPTION

Before any examples are explained in detail, it is to be understood that the claims are not limited to the details of construction and the arrangement of components set forth in the following description or illustrated in the following drawings. The piston valves disclosed in this detailed description are merely examples and, thus, other example piston valves may be practiced or carried out in other ways without departing from the scope of the claims. Also, it is to be understood that the phraseology and terminology used in this detailed description is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings, respectively. Further, "connected" and "coupled" are not restricted to physical or mechanical connections or couplings.

The following discussion is presented to enable a person skilled in the art to make and use the invention as defined by the claims. Various modifications and/or additions to the illustrated examples will be readily apparent to those skilled in the art, and the teachings disclosed herein can be applied to other examples and applications without departing from the scope of the claims. Thus, the scope of coverage of this patent is not intended to be limited to the examples shown and described in this detailed description, but this patent is to cover all methods, apparatus, and articles of manufacture falling within the scope of the claims either literally or under the doctrine of equivalents. The following detailed description is to be read with reference to the figures, in which similar or identical elements in different figures have similar or identical reference numerals. The figures, which are not to scale, depict only examples and are not intended to limit the scope of the claims. Skilled artisans will recognize the examples disclosed herein have many useful alternatives that fall within the scope of the claims either literally or under the doctrine of equivalents.

The example piston valves disclosed in this patent consistently and precisely dispense predetermined amounts of one or more fluids. For example, a piston valve in accordance with the teachings of this disclosure may include a rotor defining a bore. The rotor may be disposed in a housing having an inlet and an outlet. In some examples, a motor is operatively coupled to the rotor. The rotor may be disposed in a first dispensing position in which a first end of the bore is aligned with the inlet and a second end of the bore is aligned with the outlet of the housing. In some examples, a floating piston is disposed in the bore adjacent the first end of the bore and, thus, adjacent the inlet. A valve downstream of the piston valve may be moved from an open position to a closed position. As a result, pressure of fluid downstream of the piston may decrease, and the piston may move from the first end of the bore to the second end of the bore (i.e., away from the inlet and toward the outlet). In some examples, pressure of fluid upstream of the piston is increased to move the piston. When the piston moves from the first end of the bore to the second end of the bore, the piston displaces fluid that is in the bore downstream of the piston. As a result, the piston valve dispenses a predetermined amount of the fluid substantially corresponding to a volume of the bore between the piston and the second end of the bore. At substantially a same time, the fluid moving the piston through the bore substantially fills the bore with the predetermined amount of the fluid.

Subsequently, the rotor is rotated (e.g., 180 degrees) via the motor to a second dispensing position in which the second end of the bore is aligned with the inlet of the housing. As a result, the piston returns to a position adjacent the inlet. If a pressure differential across the piston is present, fluid flows into the bore via the inlet to move the piston from the second end of the bore to the first end of the bore (i.e., toward the outlet). As a result, the piston moves from the second end of the bore to the first end of the bore to again dispense the predetermined amount of fluid. In some embodiments, the motor cycles the rotor between the first dispensing position and the second dispensing position. In some examples, the rotor includes more than one bore and more than one piston and the housing includes more than one inlet and more than one outlet to enable the rotary metering device to dispense more than one fluid and/or increased amounts of one or more fluids.

Figure 1:
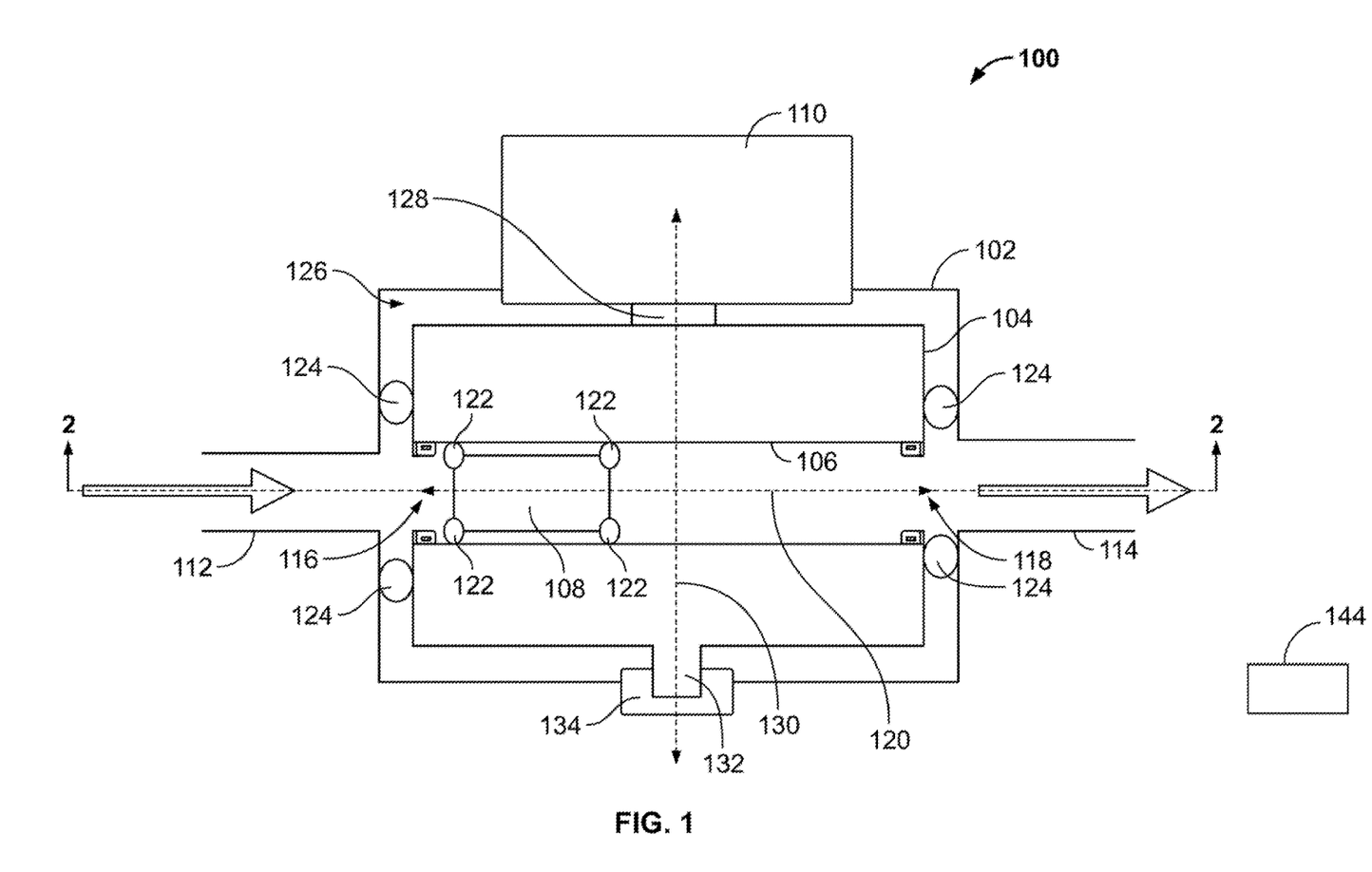
FIG. 1 is a schematic, cross-sectional view of an example piston valve in accordance with the teachings of this disclosure.

FIG. 1 is a schematic, cross-sectional view of an example piston valve 100 in accordance with this disclosure. In the illustrated example, the piston valve 100 includes a housing 102, a rotor 104 defining a bore 106, a cylindrical piston 108, and a motor 110. In the illustrated example, the piston 108 is disposed in the bore 106 of the housing 102. The housing 102 includes an inlet conduit 112 and an outlet conduit 114. In some examples, the inlet conduit 112 and/or the outlet conduit 114 are tubes, pipes, fluid lines, and/or any other structure(s) to convey a fluid.

Although not shown in FIG. 1, a fluid supply (e.g., a reservoir) may be positioned upstream of the inlet conduit 112 and in fluid communication with the inlet conduit 112. In some examples, a valve (not shown) is downstream of the outlet conduit 114 and in fluid communication with the outlet conduit 114. In some examples, when the valve is in a closed position, a pressure differential across the piston 108 is substantially zero and, thus, the piston 108 may be substantially stationary relative to the bore 106. When the dispensing valve is in an open position, a pressure downstream of the piston 108 may decrease. As a result, pressure applied to the piston 108 via fluid upstream of the piston 108 may move the piston 108 toward the outlet conduit 114. In some examples, pressure of the fluid upstream of the inlet conduit 112 is increased to move the piston 108 toward the outlet conduit 114.

The bore 106 of FIG. 1 includes a first aperture or port 116 and a second aperture or port 118. In the illustrated example, the first port 116 and the second port 118 are defined by the bore 106 and, thus, are disposed along a longitudinal axis 120 of the bore 106. In other embodiments, the first port 116 and the second port 118 are implemented in other ways. In the illustrated example of FIG. 1, the rotor 104 is in a first dispensing position. When the rotor 104 is disposed in the first dispensing position, the rotor 104 is oriented within the housing 102 such that the first port 116 is aligned with the inlet conduit 112, and the second port 118 is aligned with the outlet conduit 114. In some examples, when the first port 116 is aligned with the inlet conduit 112, the first port 116 is substantially concentric with and adjacent to the inlet conduit 112. In some examples, when the second port 118 is aligned with the outlet conduit 114, the second port 118 is substantially concentric with and adjacent to the outlet conduit 114. Thus, when the rotor 104 is in the first dispensing position, the inlet conduit 112 is in fluid communication with the bore 106 via the first port 116, and the outlet conduit 114 is in fluid communication with the bore 106 via the second port 118.

The example piston 108 includes one or more piston seals 122 (e.g., o-rings) forming a fluid seal between the piston 108 and the bore 106. As a result, the piston seals 122 prevent fluid in the bore 106 from flowing past the piston 106. Therefore, the piston 108 cooperates with the piston seals 122 to fluidly seal the bore 106 and prevent fluid from flowing directly from the inlet conduit 112 to the outlet conduit 114 via the bore 106. In one version, the piston 108 includes one piston seal 122 at each of its opposing ends that circumscribes the circumference of the piston 108. In other embodiments, more than two piston seals 122 are associated with the piston 108. Thus, the first port 116 is not in direct fluid communication with the second port 118, and the inlet conduit 112 is not in direct fluid communication with the outlet conduit 114.

The example piston valve 100 of FIG. 1 further includes one or more port seals 124 forming fluid seals between the rotor 104 and the housing 102 to prevent fluid from flowing through an annulus 126 between the rotor 104 and the housing 102. As a result, when the rotor 104 is in the first dispensing position, the inlet conduit 112 is not in fluid communication with the outlet conduit 114 via the annulus 126.

The motor 110 is operatively coupled to the rotor 104 via a first shaft 128. In some examples, the motor 110 is a stepper motor. In other examples, the motor 110 may be another type of motor. As described in greater detail below, the motor 110 rotates the rotor 104 relative to the housing 102 about an axis of rotation 130. The rotor 104 is rotatably coupled to the housing 102 via a second shaft 132 rotatably received in a fulcrum 134 such as, for example, a rotary bearing. As described in greater detail below, the piston valve 100 dispenses a predetermined amount of fluid when the motor 110 rotates the rotor 104 from the first dispensing position to a second dispensing position.

Figure 2:
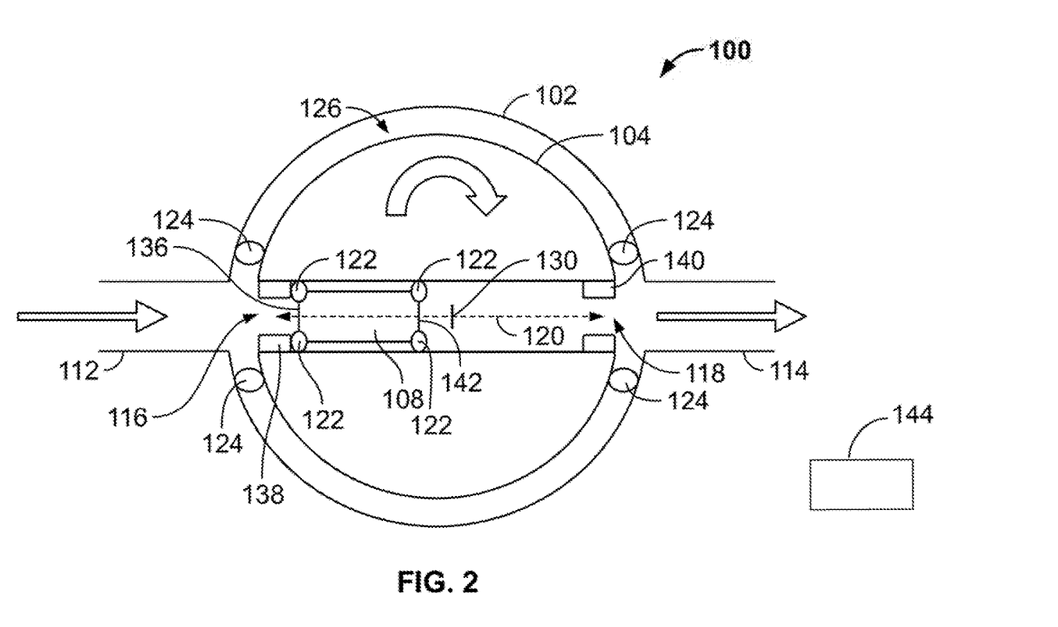
FIG. 2 is a schematic, cross-sectional view of the example piston valve of FIG. 1 along line 2-2 of FIG. 1 illustrating a piston in a first dispensing position.

FIG. 2 is a cross-sectional view of the piston valve 100 of FIG. 1 along line 2-2. The example piston valve 100 of FIG. 2 is in the first dispensing position. When the piston valve 100 is initially in the first dispensing position, the piston 108 is in a first stroke position in which a first end 136 of the piston 108 abuts a first stop 138. The example first stop 138 is disposed within the bore 106 and is adjacent to and/or coincides with the first port 116. For example, the first stop 138 may extend from the first port 116 toward the second port 118 such that the first end 136 of the piston 108 is spaced apart from the first port 116 by a predetermined distance when the first end 136 of the piston 108 abuts the first stop 138. The example rotor 104 includes a second stop 140 disposed within the bore 106 and adjacent to and/or coinciding with the second port 118. For example, the second stop 140 may extend from the second port 118 toward the first port 116 such that the piston 108 is spaced apart from the second port 118 by a predetermined distance when a second end 142 of the piston 108 abuts the second stop 140 as described in greater detail below in conjunction with FIG. 3.

In some examples, one or more of the stops 138, 140 are implemented by having the bore 106 and the piston 108 dimensioned larger than the outlet inlet conduit 112 and the outlet conduit 114. For example, the piston 108 may have a diameter of between about 0.2 cm to about 1 cm, or between about 0.4 cm to about 0.8 cm, or about 0.48 cm, and the inlet conduit 112 and the outlet conduit 114 may have diameters of between about 0.1 cm to about 0.8 cm, or between about 0.2 cm to about 0.4 cm, or about 0.32 cm. Thus, in such examples, the piston 108 abuts against the housing 102 when the piston 108 is in the first stroke position or a second stroke position as described in more detail below.

Figure 3:
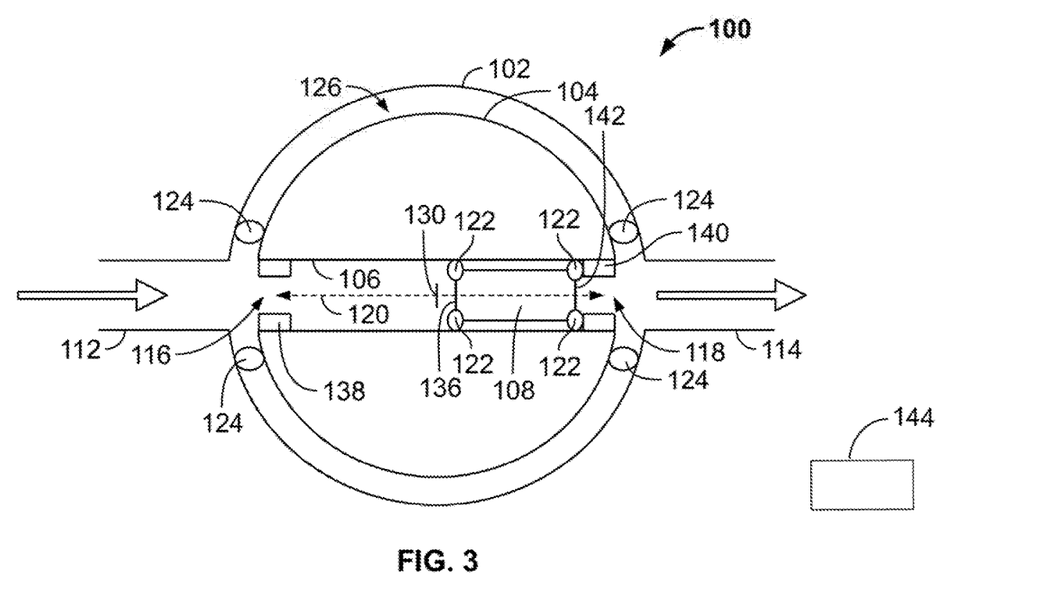
FIG. 3 is a schematic, cross-sectional view of the example piston valve of FIG. 1 along line 2-2 of FIG. 1 illustrating the piston in a second dispensing position.

When the rotor 104 is initially in the first dispensing position and the valve (not shown) downstream of the piston valve 100 opens, pressure downstream of the piston 108 decreases. As a result, the fluid generates a pressure differential across the piston 108 and between the inlet conduit 112 and the outlet conduit 114, which causes the piston 108 to move from the first stroke position toward the second port 118 and the outlet conduit 114. When the piston 108 moves toward the second port 118, the piston 108 displaces fluid in the bore 106 downstream of the piston 108. As a result, the fluid flows out of the bore 106 and into the outlet conduit 114 until the piston 108 moves into a second stroke position in which the second end 142 of the piston 108 abuts or contacts the second stop 142 as illustrated in FIG. 3. In some examples, the valve downstream of the piston 108 is a relief valve and pressure upstream of the piston 108 increases to generate the pressure differential across the piston 108 to move the piston 108.

FIG. 3 is a cross-sectional view of the piston valve 100 along line 2-2 of FIG. 1 illustrating the piston 108 in the second stroke position. When the piston 108 moves from the first stroke position to the second stroke position, the piston 108 displaces a predetermined amount of the fluid in the bore 106 to dispense the predetermined amount of fluid. At substantially a same time, the fluid applying pressure to the piston 108 substantially fills the bore 106 from the first port 116 to the first end 136 of the piston 108.

Figure 4:
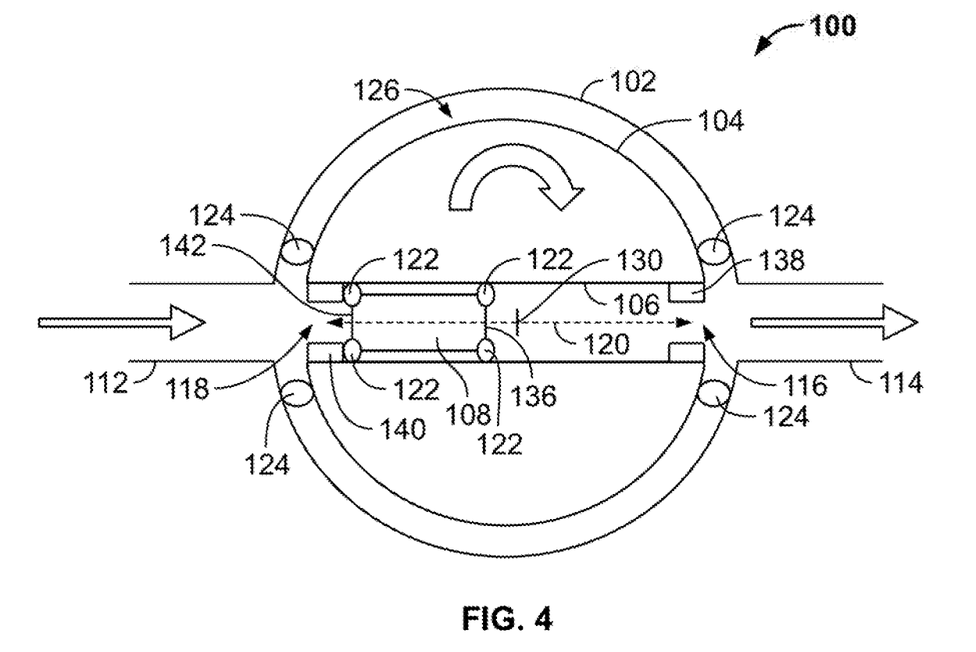
FIG. 4 is a schematic, cross-sectional view of the example piston valve of FIG. 1 along line 2-2 of FIG. 1 illustrating the piston returned to the first dispensing position.

FIG. 4 is a cross-sectional view of the piston valve 100 along line 2-2 illustrating the rotor 104 in the second dispensing position. In some examples, after the piston 108 moves from the first stroke position to the second stroke position, the motor 110 rotates the rotor 104 about 180 degrees from the first dispensing position to the second dispensing position. In the illustrated example, the axis of rotation 130 of the rotor 104 is perpendicular to the longitudinal axis 120 of the bore 106. When the rotor 104 is in the second dispensing position, the rotor 104 is oriented within the housing 102 such that the second port 118 of the bore 106 is aligned with the inlet conduit 112, and the first port 116 of the bore 106 is aligned with the outlet conduit 114. Thus, when the rotor 104 is in the second dispensing position, the inlet conduit 112 is in fluid communication with the bore 106 via the second port 118, and the outlet conduit 114 is in fluid communication with the bore 106 via the first port 116.

When the rotor 104 initially moves into the second dispensing position from the first dispensing position, the piston 108 is in the second stroke position in which the piston 108 abuts the second stop 140. Further, rotation of the rotor 104 causes the fluid in the bore 106 that was upstream of the piston 108 when the rotor 104 was in the first dispensing position to be in the bore 106 downstream of the piston 108 when the rotor 104 is initially in the second dispensing position. As a result, the piston 108 is returned to a position adjacent the inlet conduit 112 and obstructs fluid flow from the inlet conduit 112 into the bore 106, and the bore 106 downstream of the piston 108 (i.e., between the first end 136 of the piston and the first port 116) is filled with the predetermined amount of the fluid. The fluid in the inlet conduit 112 and/or the outlet conduit 114 generates a pressure differential across the piston 108 and between the inlet conduit 112 and the outlet conduit 114. As a result, the piston 108 moves from the second stroke position (FIG. 4) toward the outlet conduit 114 and into the first stroke position (FIG. 2) in which the first end 136 of the piston 108 contacts the first stop 138. When the piston 108 moves from the second stroke position to the first stroke position, the piston valve 100 dispenses the predetermined amount of the fluid.

Once the piston 108 is in the first stroke position, the motor 110 rotates the rotor 104 from the second dispensing position (FIG. 4) to the first dispensing position (FIG. 2) to dispense the predetermined amount of the fluid. In some examples, the motor 110 cycles the rotor 104 from the first dispensing position to the second dispensing position and from the second dispensing position to the first dispensing position to dispense a plurality of doses of the predetermined amount of the fluid.

Figure 5:
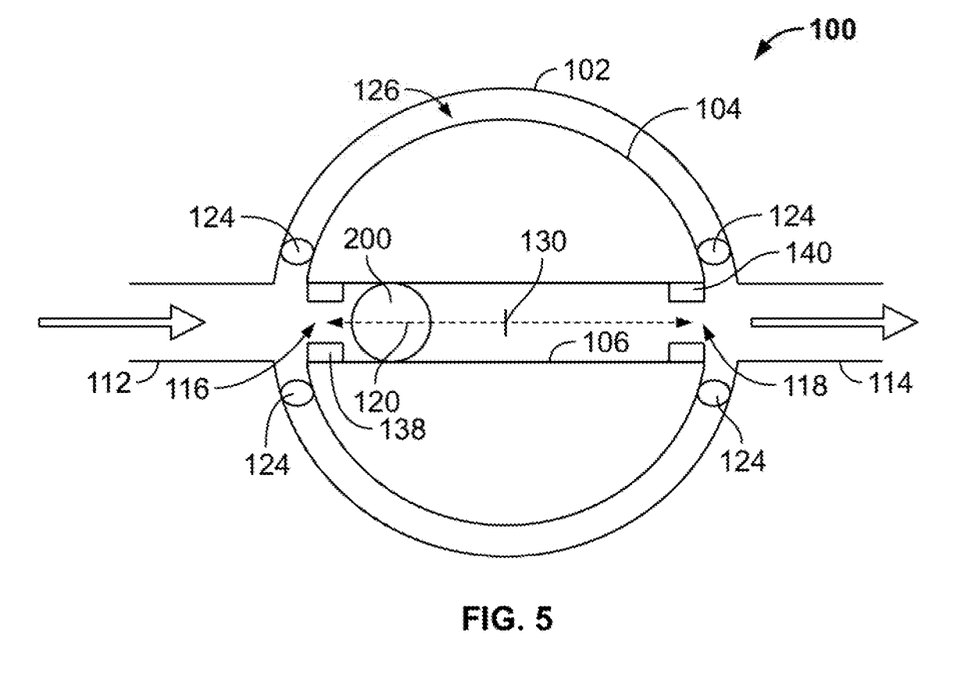
FIG. 5 is a schematic, cross-sectional view of the example piston valve of FIGS. 1-4 employing an alternative piston in accordance with the teachings of this disclosure.

FIG. 5 illustrates the piston valve 100 of FIGS. 1-4 employing a spherical piston 200. Although the example piston valve 100 of FIGS. 1-4 employs the cylindrical piston 108 and the example piston valve 100 of FIG. 5 employs the spherical piston 200, the piston valve 100 may employ pistons having other shapes and/or configurations in other examples. In some such examples in which one or more of the stops 138, 140 are implemented by having the bore 106 and the piston 108 dimensioned larger than the outlet inlet conduit 112 and the outlet conduit 114, the housing 102 may include indents or shoulders around and/or near the inlet conduit 112 and/or the outlet conduit 114 to facilitate seating of the spherical piston 200.

Figure 6:
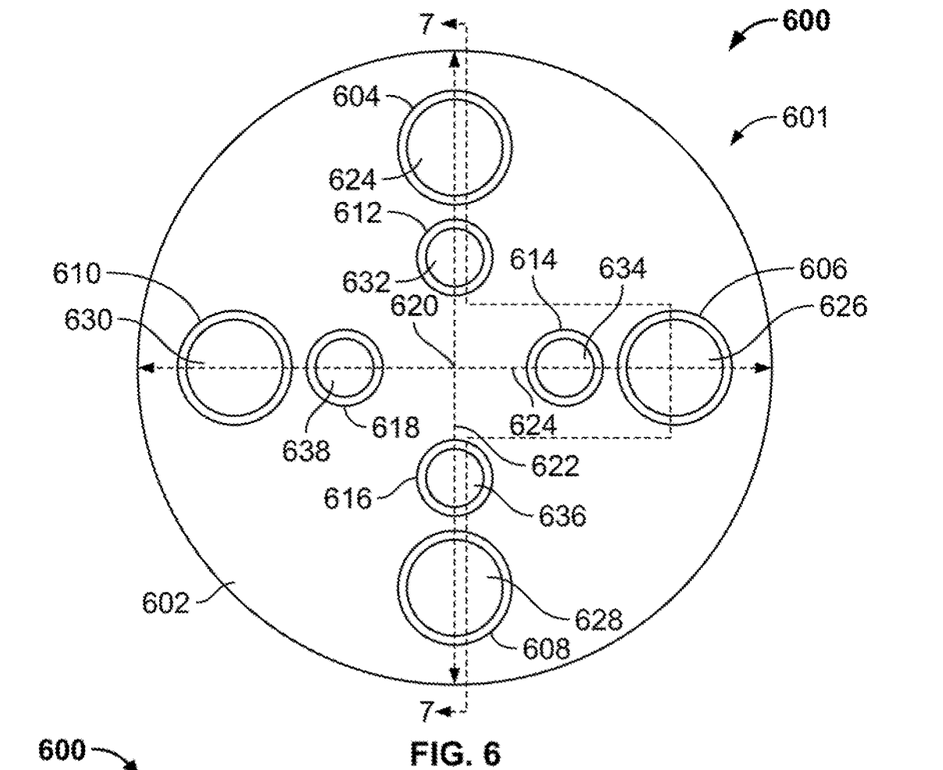
FIG. 6 is front view of an example rotor or piston drum of another example piston valve.

FIG. 6 is a schematic, front view of a rotor or piston drum 600 of another example piston valve 601 in accordance with the teachings of this disclosure. When the piston drum 600 is disposed in a dispensing position, the example piston drum 600 of FIG. 6 dispenses a plurality of doses of a first predetermined amount of a first fluid and a plurality of doses of a second predetermined amount of a second fluid. In the illustrated example, the piston drum 600 includes a cylindrical housing 602 defining a first bore 604, a second bore 606, a third bore 608, a fourth bore 610, a fifth bore 612, a sixth bore 614, a seventh bore 616, and an eighth bore 618 (collectively referred to as "the bores 604, 606, 608, 610, 612, 614, 616, 618"). The bores 604, 606, 608, 610, 612, 614, 616, 618 are substantially parallel to each other and a central longitudinal axis 620 of the piston drum 600. In the illustrated example, the central, longitudinal axis 620 extends into the page from the perspective of FIG. 6.

In the illustrated example, the first bore 604, the second bore 606, the third bore 608, and the fourth bore 610 (collectively referred to as the "outer bores 604, 606, 608, 610") are each spaced apart from the central, longitudinal axis 620 of the piston drum 600 by substantially a same first distance. In addition, in the illustrated example, the outer bores 604, 606, 608, 610 are disposed symmetrically relative to the central, longitudinal axis 620. For example, the first bore 604 and the third bore 608 are disposed on a first diameter 622 of the housing 102 on opposing sides of the central, longitudinal axis 620. The second bore 606 and the fourth bore 610 are on opposing sides of the central, longitudinal axis 620, and the second bore 606 and the fourth bore 610 are disposed on a second diameter 624 of the housing 602 perpendicular to the first diameter 622. In the illustrated example, the outer bores 604, 606, 608, 610 have substantially a same first radius dimension.

The fifth bore 612, the sixth bore 614, the seventh bore 616, and the eighth bore 618 (collectively referred to as the "inner bores 612, 614, 616, 618") are spaced apart from the central, longitudinal axis 620 of the piston drum 600 by substantially a same second distance less than the first distance. In addition, in the illustrated example, the inner bores 612, 614, 616, 618 are disposed symmetrically relative to the central, longitudinal axis 620. For example, the fifth bore 612 and the seventh bore 616 are disposed on the first diameter 622 of the housing 602 on opposing sides of the central, longitudinal axis 620. The sixth bore 612 and the eighth bore 618 are disposed on the second diameter 624 of the housing 602 on opposing sides of the central, longitudinal axis 620. In the illustrated example, the inner bores 612, 614, 616, 618 have substantially a second radius smaller than the first radius of the outer bores 604, 606, 608, 610. In other examples, the bores 604, 606, 608, 610, 612, 614, 616, 618 are implemented in other ways. For examples, the bores 604, 606, 608, 610, 612, 614, 616, 618 may be disposed asymmetrically relative to the central, longitudinal axis 620, disposed at different distances from the central, longitudinal axis 620, dimensioned to be other sizes, etc. In some examples, the piston drum 600 has other numbers of bores (e.g., 1, 2, 3, 4, 5, 6, 7, 9, . . . , 20, etc.)

In the illustrated example, a first piston 624 is disposed in the first bore 604, a second piston 626 is disposed in the second bore 606, a third piston 628 is disposed in the third bore 608, and a fourth piston 630 is disposed in the fourth bore 610. The first piston 624, the second piston 626, the third piston 628, and the fourth piston 630 (collectively referred to as "the outer pistons 624, 626, 628, 630") each has a third radius dimensioned to enable the first piston 624, the second piston 626, the third piston 628, and the fourth piston 630 to sealingly and slidably engage a respective one of the outer bores 612, 614, 616, 618. In some examples, each of the outer pistons 624, 626, 628, 630 include one or more seals to form a fluid seal between the outer pistons 624, 626, 628, 630 and the respective outer bores 612, 614, 616, 618.

A fifth piston 632 is disposed in the fifth bore 612, a sixth piston 634 is disposed in the sixth bore 614, a seventh piston 636 is disposed on the seventh bore 616, and an eighth piston 638 is disposed in the eighth bore 618. Each of the fifth piston 632, the sixth piston 634, the seventh piston 636, and the eight piston 638 (collectively referred to as the "inner pistons 632, 634, 636, 638") has a fourth radius dimensioned to enable the inner pistons 632, 634, 636, 638 to sealingly and slidably engage a respective one of the inner bores 612, 614, 616, 618. Thus, in the illustrated example, the fourth radius of each of the inner pistons 632, 634, 636, 638 is less than the third radius of each of the outer pistons 624, 626, 628, 630.

Figure 7:
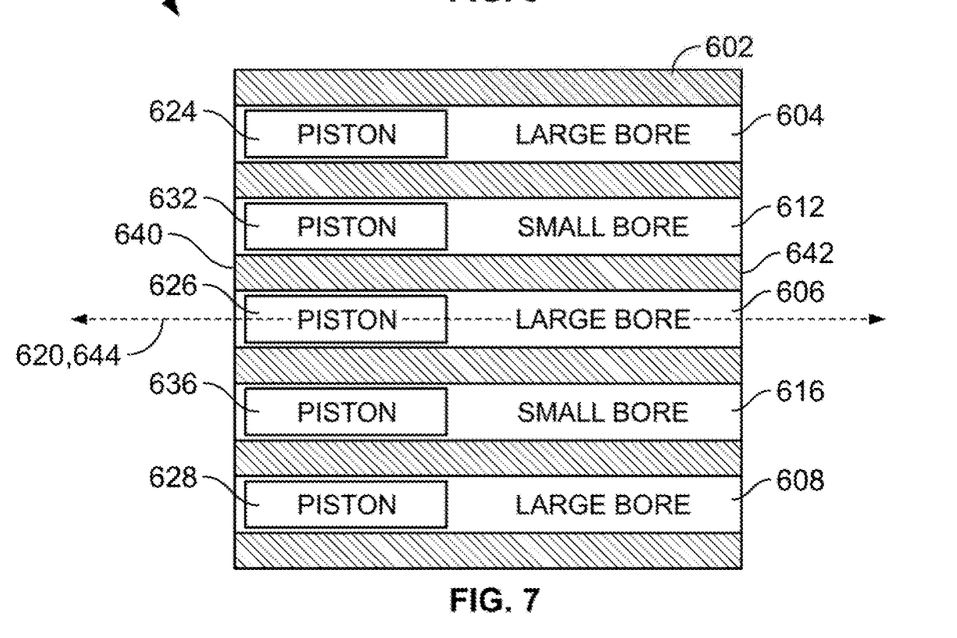
FIG. 7 is a cross-sectional view of the example piston drum of FIG. 6 along line 7-7 of FIG. 6.

FIG. 7 is a cross-sectional view of the piston drum 600 of FIG. 24 along line 7-7, illustrating the first bore 604, the second bore 606, the third bore 608, the fifth bore 612, and the seventh bore 616. In the illustrated example, the outer bores 604, 606, 608, 610 and the inner bores 612, 614, 616, 618 extend from a first end face 640 of the housing 602 to a second end face 642 of the housing 602. Thus, the outer bores 604, 606, 608, 610 and the inner bores 612, 614, 616, 618 extend through the housing 602. In the illustrated example, the outer bores 604, 606, 608, 610 receive the first fluid. The inner bores 612, 614, 616, 618 receive the second fluid. In some examples, the first fluid is different than the second fluid. For example, the first fluid may be water, and the second fluid may be syrup. In the illustrated example, the central, longitudinal axis 620 is collinear with an axis of rotation 644 of the piston drum 600.

Figure 8:
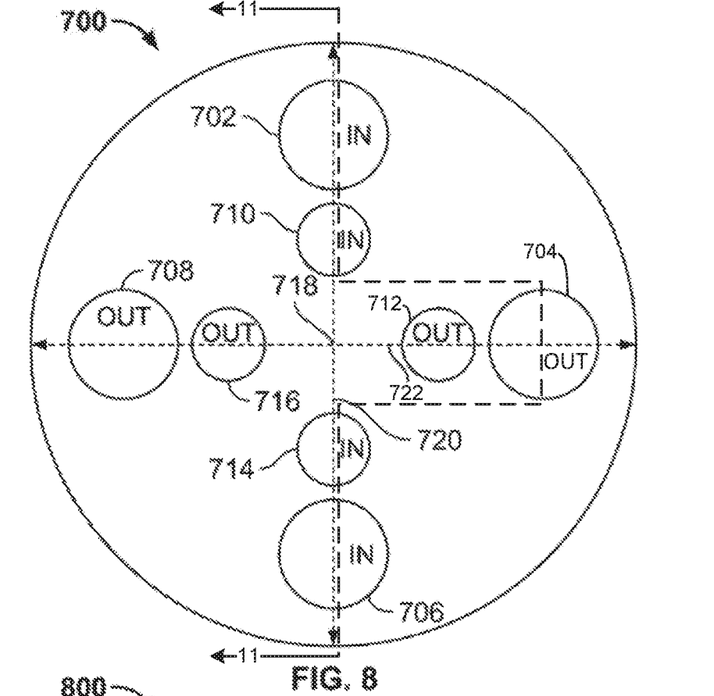
FIG. 8 is a front view of an example first plate rotatably coupled to a first end face of the example piston drum of FIGS. 6 and 7.

FIG. 8 is a front view of a first plate 700 rotatably coupled to the first end face 640 of the piston drum 600 of FIGS. 6 and 7. In the illustrated example, the first plate 700 includes a first aperture 702, a second aperture 704, a third aperture 706, and a fourth aperture 708 (collectively referred to as "the outer apertures 702, 704, 706, 708"). The first plate 700 also includes a fifth aperture 710, a sixth aperture 712, a seventh aperture 714, and an eighth aperture 716 (collectively referred to as "the inner apertures 710, 712, 714, 716"). As described in greater detail below, the first plate 700 enables one or more fluid supplies (e.g., reservoirs) to be in fluid communication with the piston drum 600 and directs the first fluid and/or the second fluid into and/or out of one or more of bores 604, 606, 608, 610, 612, 614, 616, 618 of the piston drum 600.

In the illustrated example, the outer apertures 702, 704, 706, 708 are each spaced apart from a center 718 of the first plate 700 by the first distance. In addition, in the illustrated example, the outer apertures 702, 704, 706, 708 are disposed symmetrically relative to the center 718 of the first plate 700. For example, the first aperture 702 and the third aperture 706 are disposed on a third diameter 720 of the first plate 700 on opposing sides of the center 718 of the first plate 700. The second outer aperture 704 and the fourth outer aperture 708 are disposed on opposing sides of the center 718 and on a fourth diameter 722 of the first plate 700 perpendicular to the third diameter 722. In the illustrated example, each of the outer apertures 702, 704, 706, 708 has substantially the same first radius as the outer bores 612, 614, 616, 618 of the piston drum 600.

Each of the inner apertures 710, 712, 714, 716 is spaced apart from the center 718 of the first plate 700 by the second distance. In addition, in the illustrated example, the inner apertures 710, 712, 714, 716 are disposed symmetrically relative to the center 718 of the first plate 700. For example, the fifth aperture 710 and the seventh aperture 714 are disposed on the third diameter 720 of the first plate 700 on opposing sides of the center 718. The sixth aperture 712 and the eighth aperture 716 are disposed on the fourth diameter 722 of the first plate 700 on opposing sides of the center 718. In the illustrated example, the inner apertures 710, 712, 714, 716 have substantially a same second radius as the inner bores 612, 614, 616, 618 of the piston drum 600.

Figure 9:
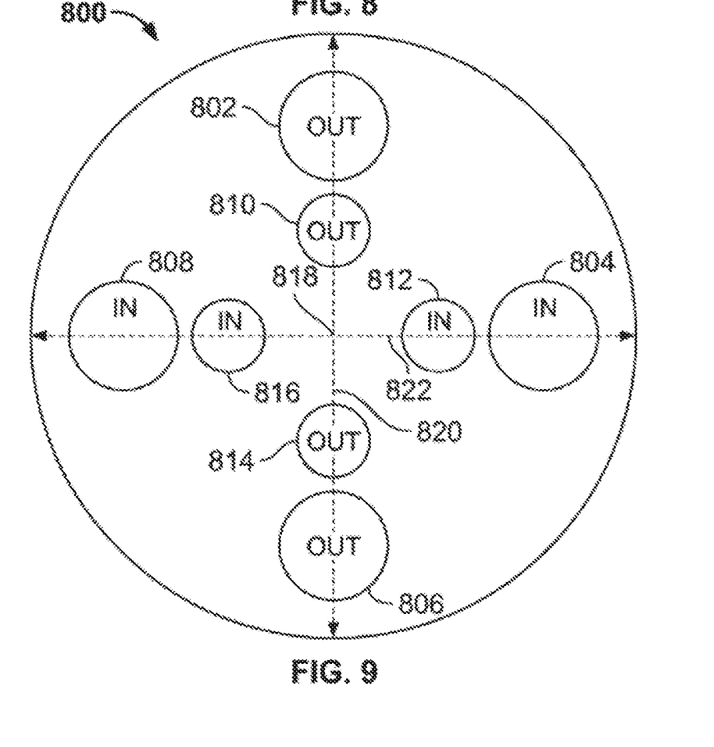
FIG. 9 is a front view of an example second plate rotatably coupled to a second end face of the example piston drum of FIGS. 6 and 7.

FIG. 9 is a front view of a second plate 800 rotatably coupled to the second end face 642 of the piston drum 600 of FIGS. 6 and 7. In the illustrated example, the second plate 800 includes a first aperture 802, a second aperture 804, a third aperture 806, and a fourth aperture 808 (collectively referred to as "the outer apertures 802, 804, 806, 808"). The second plate 800 also includes a fifth aperture 810, a sixth aperture 812, a seventh aperture 814, and an eighth aperture 816 (collectively referred to as "the inner apertures 810, 812, 814, 816"). As described in greater detail below, the second plate 800 enables one or more fluid supplies (e.g., reservoirs) to be in fluid communication with the piston drum 600 and directs the first fluid and/or the second fluid into and/or out of one or more of bores 604, 606, 608, 610, 612, 614, 616, 618 of the piston drum 600.

In the illustrated example, the outer apertures 802, 804, 806, 808 are each spaced apart from a center 818 of the second plate 800 by the first distance. In addition, in the illustrated example, the outer apertures 802, 804, 806, 808 are disposed symmetrically relative to the center 818 of the second plate 800. For example, the first aperture 802 and the third aperture 806 are disposed on a third diameter 820 of the second plate 800 on opposing sides of the center 818. The second aperture 804 and the fourth aperture 808 are disposed on opposing sides of the center 818 and on a fourth diameter 822 of the second plate 800 perpendicular to the third diameter 822. In the illustrated example, each of the outer apertures 802, 804, 806, 808 has substantially the same first radius as the outer bores 612, 614, 616, 618 of the piston drum 600.

Each of the inner apertures 810, 812, 814, 816 is spaced apart from the center 818 of the second plate 800 by the second distance. In addition, in the illustrated example, the inner apertures 810, 812, 814, 816 are disposed symmetrically relative to the center 818 of the second plate 800. For example, the fifth aperture 810 and the seventh aperture 814 are disposed on the third diameter 820 of the second plate 800 on opposing sides of the center 818. The sixth aperture 816 and the eighth aperture 812 are disposed on the fourth diameter 822 of the second plate 800 on opposing sides of the center 818. In the illustrated example, the inner apertures 810, 812, 814, 816 have substantially a same second radius as the inner bores 612, 614, 616, 618 of the piston drum 600.

Figure 10:
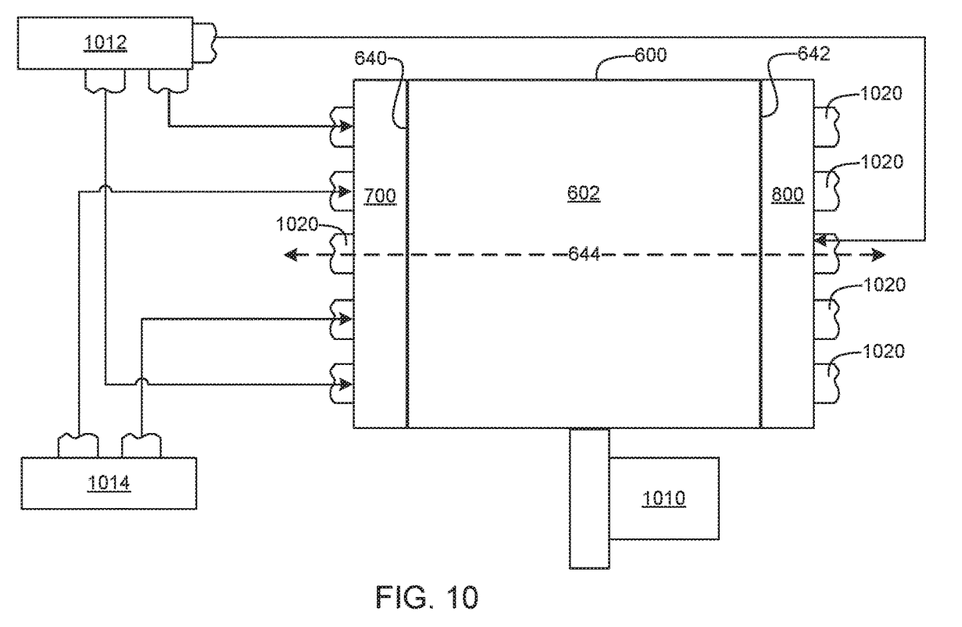
FIG. 10 is a schematic view of an example dispensing system including the example first plate of FIG. 8 and the example second plate of FIG. 9 rotatably coupled to the example piston drum of FIGS. 6 and 7, a plurality of reservoirs, and a motor.
Figure 11:
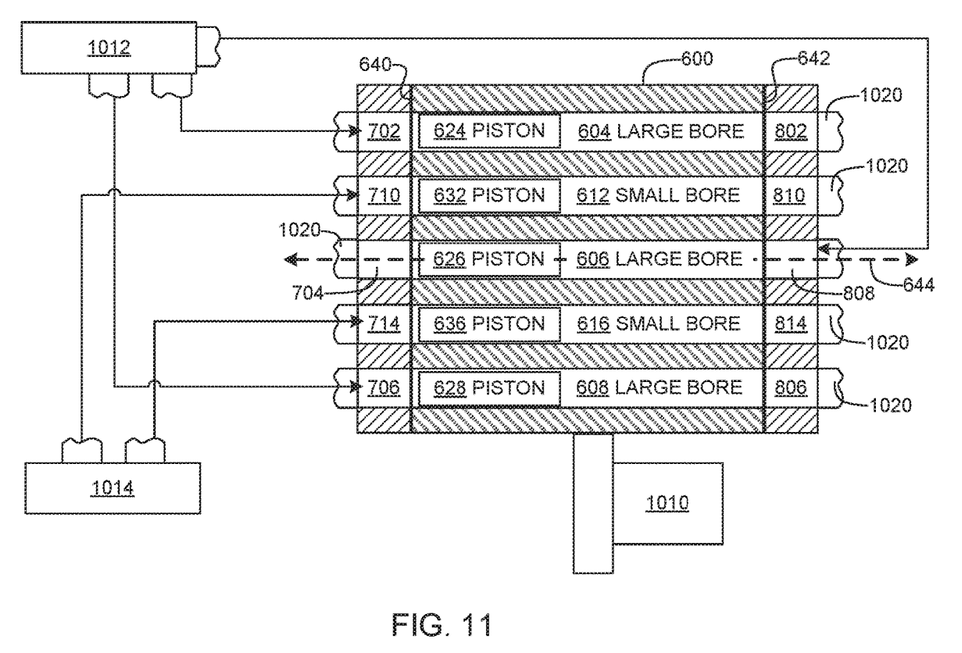
FIG. 11 is another schematic view of the example dispensing system of FIG. 10 with the example first plate of FIGS. 8 and 10, the example second plate of FIGS. 9 and 10, and the example piston drum of FIGS. 6, 7, and 10 in cross-section along line 11-11 of FIG. 8.

With reference to FIGS. 10 and 11, during operation of the piston drum 600, a motor 1010 rotates the piston drum 600 relative to the first plate 700 and the second plate 800 about the axis of rotation 644. In some examples, as shown in FIGS. 10 and 11, the first plate 700 and the second plate 800 sealingly engage the first end face 640 and the second end face 642, respectively. The first plate 700 and the second plate 800 may be in fluid communication with one or more first fluid supplies 1012 (e.g., reservoirs) storing the first fluid and one or more second fluid supplies 1014 (e.g., reservoirs) storing the second fluid to enable the piston drum 600 to receive the first fluid and the second fluid, as shown in FIGS. 10 and 11. Further, the first plate 700 and the second plate 800 may be operatively coupled to one or more fluid conduits 1020 to convey the first fluid and the second fluid dispensed via the piston drum 600 to, for example, a mixing chamber, a dispensing valve and/or one or more additional and/or alternative components, systems, and/or outlets, as shown in FIGS. 10 and 11.

The motor 1010 rotates the piston drum 600 to a first dispensing position to dispense the first fluid and the second fluid. In some examples, the first plate 700 and the second plate 800 are substantially stationary. When the piston drum 600 rotates to the first dispensing position, the outer bores 604, 606, 608, 610 and the inner bores 612, 614, 616, 618 align with and, thus, are in fluid communication with the outer apertures 702, 704, 706, 708 and the inner apertures 710, 712, 714, 716, respectively, of the first plate 700 and the outer apertures 802, 804, 806, 808 and the inner apertures 810, 812, 814, 816, respectively, of the second plate 800. As a result, the piston drum 600 receives the first fluid and the second fluid and dispenses the first fluid and the second fluid. In some examples, when the piston drum 600 is in the first dispensing position, the first fluid and the second fluid flow into the piston drum 600 via the first end face 640 and the second end face 642, and the first fluid and the second fluid are dispensed from the piston drum 600 via the first end face 640 and the second end face 642.

For example, the first fluid may be supplied to the piston drum 600 via the first aperture 702 and the third aperture 706 of the first plate 700. When the first fluid is supplied to the piston drum 600 via the first aperture 702 and the third aperture 706, the first fluid moves the first piston 624 and the third piston 628 from the first end face 640 of the piston drum 600 to the second end face 642 of the piston drum 600. As a result, the first piston 624 and the third piston 628 displace the first fluid in the first bore 604 and the third bore 608, respectively, to dispense the first fluid via the first aperture 802 and the third aperture 806 of the second plate 800. At substantially a same time, the first fluid moving the first piston 624 and the third piston 628 substantially fills the first bore 604 and the third bore 608, respectively, and, thus, replenishes the first bore 604 and the third bore 608 with respective doses of the first predetermined amount of the first fluid.

In some examples, when the piston drum 600 is in the first dispensing position, the first fluid is supplied to the piston drum 600 via the second aperture 804 and the fourth aperture 808 of the second plate 800. When the first fluid is supplied to the piston drum 600 via the second aperture 804 and the fourth aperture 808, the first fluid moves the second piston 626 and the fourth piston 630 from the second end face 642 of the piston drum 600 to the first end face 640 of the piston drum 600. As a result, the second piston 626 and the fourth piston 630 displace the first fluid in the second bore 606 and the third bore 610, respectively, to dispense the first fluid via the second aperture 804 and the fourth aperture 808 of the second plate 800. At substantially a same time, the first fluid moving the second piston 626 and the fourth piston 630 substantially fills the second bore 606 and the fourth bore 610 and, thus, replenishes the second bore 606 and the fourth bore 610 with respective doses of the first predetermined amount of the first fluid.

When the piston drum 600 is in the first dispensing position, the second fluid is also supplied to the piston drum 600 via the fifth aperture 710 and the seventh aperture 714 of the second plate 800. When the second fluid is supplied to the piston drum 600 via the fifth aperture 710 and the seventh aperture 714, the second fluid moves the fifth piston 632 and the seventh piston 636 from the first end face 640 of the piston drum 600 to the second end face 642 of the piston drum 600. As a result, the fifth piston 632 and the seventh piston 636 displace the second fluid in the fifth bore 612 and the seventh bore 616, respectively, to dispense the second fluid via the fifth aperture 710 and the seventh aperture 714 of the second plate 800. At substantially a same time, the second fluid substantially fills the fifth bore 612 and the seventh bore 616 and, thus, replenishes the fifth bore 612 and the seventh bore 616 with respective doses of the second predetermined amount of the second fluid.

When the piston drum 600 is in the first dispensing position, the second fluid is also supplied to the piston drum 600 via the sixth aperture 812 and the eighth aperture 816 of the second plate 800. When the second fluid is supplied to the piston drum 600 via the sixth aperture 812 and the eighth aperture 816, the second fluid moves the sixth piston 634 and the eighth piston 638 from the second end face 642 of the piston drum 600 to the first end face 640 of the piston drum 600. As a result, the sixth piston 634 and the eighth piston 638 displace the second fluid in the sixth bore 614 and the eighth bore 618, respectively, to dispense the second fluid via the sixth aperture 712 and the eighth aperture 716 of the first plate 700. When the sixth piston 634 and the eighth piston 638 move from the second end face 642 of the piston drum 600 to the first end face 640, the second fluid substantially fills the sixth bore 614 and the eighth bore 618 and, thus, replenishes the sixth bore 614 and the eighth bore 618 with respective doses of the second predetermined amount of the second fluid. Thus, when the piston drum 600 is in the first dispensing position, the piston drum 600 dispenses four doses of the first predetermined amount of the first fluid and four doses of the second predetermined amount of the second fluid.

After the piston drum 600 dispenses the first fluid and the second fluid, the motor 1010 rotates the piston drum 600 in a first direction from the first dispensing position to a second dispensing position to again dispense and receive the first fluid and the second fluid. In the illustrated example, the piston drum 600 rotates about ninety degrees from the first dispensing position to the second dispensing position. In other examples, the piston drum 600 rotates other numbers of degrees (e.g., 30 degrees, 60 degrees, 180 degrees, and/or other numbers of degrees) to move from the first dispensing position to the second dispensing position. When the piston drum 600 is in the second dispensing position, the outer bores 604, 606, 608, 610 align with different ones of the outer apertures 702, 704, 706, 708 of the first plate 700 and the outer apertures 802, 804, 806, 808 of the second plate 800 than when the piston drum 600 is in the first dispensing position. In addition, the inner bores 612, 614, 616, 618 align with different ones of the inner apertures 710, 712, 714, 716 of the first plate 700 and the inner apertures 810, 812, 814, 816 of the second plate 800 than when the piston drum 600 is in the first dispensing position. As a result, the first fluid is supplied to the piston drum 600 to move the outer pistons 624, 626, 628, 630, and the second fluid is supplied to the piston drum 600 to move the inner pistons 632, 634, 636, 638. As a result, the piston valve 601 dispenses the first fluid and the second fluid. At substantially a same time, each the outer bores 604, 606, 608, 610 is replenished with respective doses of the first predetermined amount of the first fluid and each of the inner bores 612, 614, 616, 618 is replenished with respective doses of the second predetermined amount of the second fluid.

The motor 1010 may then rotate the piston drum 600 in the first direction to a third dispensing position to align the bores 604, 606, 608, 610, 612, 614, 616, 618 with different ones of the apertures 702, 704, 706, 708, 710, 712, 714, 716 of the first plate 700 and different ones of the apertures 802, 804, 806, 808, 810, 812, 814, 816 of the second plate 800 to dispense and receive the first fluid and the second fluid. Subsequently, the piston drum 600 may be rotated in the first direction to a fourth dispensing position to dispense and receive the first fluid and the second fluid, and then the piston drum 600 may be rotated in the first direction to the first dispensing position to dispense and receive the first fluid and the second fluid. Thus, in the illustrated example, the piston drum 600 dispenses 16 doses of the first predetermined amount of the first fluid and 16 doses of the second predetermined amount of the second fluid per each 360 degrees of rotation of the piston drum 600. In other examples, the piston drum 600 may dispense other numbers of doses of the first fluid, the second fluid, and/or one or more additional and/or alternative fluids per each 360 degrees of rotation of the piston drum 600.

In some examples, the first fluid dispensed from one or more of the outer bores 604, 606, 608, 610 is mixed with the second fluid dispensed from one or more of the inner bores 612, 614, 616, 618 to generate a mixture. For example, if the first fluid is carbonated water and the second fluid is syrup, the first fluid may be mixed with the second fluid downstream of the piston drum 600 to generate a carbonated soft drink or soda having a predetermined ratio of the first fluid to the second fluid.

The fluid dispensing system (i.e., piston valve and its associated components) may be used in a variety of applications. For example, the piston valve may be used in the system disclosed in U.S. Provisional Patent Application 62/334,812, filed on May 11, 2016, and incorporated by reference in its entirety. Additionally, the piston valve may be used in other fluid dispensing applications including food and/or beverage mixing applications (soda, coffee, espresso, tea, and the like), chemical fluid applications, and other applications where dispensing a precise amount of fluid is useful.

The fluids dispensed through the embodiments disclosed throughout can include, for example, tap water, purified water, carbonated water, syrup, a liquid sweetener, juice, soda, tea, espresso, coffee, alcoholic beverages, milk or other dairy-based liquids, and other liquids designed to be dispensed in a precise amount where quality and/or taste may be otherwise impacted.

It will be appreciated by those skilled in the art that while particular examples have been described above, the claims are not necessarily so limited, and that numerous other examples, uses, modifications and departures from the examples and uses are encompassed by the claims attached hereto. The entire disclosure of each patent and publication cited herein is incorporated by reference, as if each such patent or publication were individually incorporated by reference herein.

The invention claimed is:

1. A fluid dispensing valve, comprising:
 a first plate defining (i) a first inlet bore that is a first outer inlet bore, (ii) a first outlet bore that is a first outer outlet bore, (iii) a first inner inlet bore, and (iv) a first inner outlet bore, relative to a central longitudinal axis of the first plate;
 a second plate defining (i) a second inlet bore that is a second outer inlet bore, (ii) a second outlet bore that is a second outer outlet bore, (iii) a second inner inlet bore, and (iv) a second inner outlet bore, relative to a central longitudinal axis of the second plate;
 a drum disposed between and rotatably engaged with the first plate and the second plate, the drum defining (i) a dosing bore that is an outer dosing bore, and (ii) an inner dosing bore, relative to a central longitudinal axis of the drum; and
 a slider slidably disposed in the dosing bore,
 wherein the central longitudinal axis of the first plate, the central longitudinal axis of the second plate, and the central longitudinal axis of the drum is each collinear with an axis of rotation of the drum.

2. The fluid dispensing valve of claim 1, wherein at least one of the first plate and the second plate is sealingly engaged with the drum.

3. The fluid dispensing valve of claim 1, wherein:
 the dosing bore is aligned with the first inlet and the first outlet when the drum is in a first dispensing position, and the dosing bore is aligned with the second inlet and the second outlet when the drum is in a second dispensing position.

4. The fluid dispensing valve of claim 1, wherein the slider is slidably captured in the dosing bore.

5. The fluid dispensing valve of claim 1, wherein:
the drum has a first end and a second end,
the first plate is engaged with the first end,
the second plate is engaged with the second end,
when the drum is in a first dispensing position, a first fluid pressure applied to the slider via the first inlet pushes the slider toward the second end, and
when the drum is in a second dispensing position, a second fluid pressure applied to the slider via the second inlet pushes the slider toward the first end.

6. The fluid dispensing valve of claim 1, wherein the slider is sealingly engaged with the drum.

7. The fluid dispensing valve of claim 1, wherein:
the slider is an outer slider; and further comprising
an inner slider slidably disposed in the inner dosing bore.

8. The fluid dispensing valve of claim 7, wherein:
the outer dosing bore defines a first volume,
the inner dosing bore defines a second volume, and
the first volume relates to the second volume in a predetermined ratio.

9. The fluid dispensing valve of claim 7, wherein the inner dosing bore is radially aligned with the outer dosing bore, relative to the central longitudinal axis of the drum and a radius of the drum extending from the central longitudinal axis of the drum.

10. The fluid dispensing valve of claim 1, wherein:
the dosing bore is one of a plurality of dosing bores defined by the drum, and
the slider is one of a plurality of sliders slidably disposed in respective ones of the plurality of dosing bores.

11. The fluid dispensing valve of claim 1, wherein:
the slider limits a first fluid flow from the first inlet toward the first outlet, and
the slider limits a second fluid flow from the second inlet toward the second outlet.

12. The fluid dispensing valve of claim 1, wherein:
the first inlet and the first outlet are evenly circumferentially spaced about the first plate, and
the second inlet and the second outlet are evenly circumferentially spaced about the second plate.

13. The fluid dispensing valve of claim 1, wherein the drum is between a first dispensing fluid and a second dispensing fluid, the drum
blocks a first fluid flow from the first inlet toward the first outlet, and
blocks a second fluid flow from the second inlet toward the second outlet.

14. The fluid dispensing valve of claim 1, wherein the slider is a cylindrical piston.

15. The fluid dispensing valve of claim 1, wherein the first and second plates are configured to be substantially stationary relative to one another.

16. A fluid dispensing apparatus, comprising
a first plate defining (i) a first inlet bore that is a first outer inlet bore, (ii) a first outlet bore that is a first outer outlet bore, (iii) a first inner inlet bore, and (iv) a first inner outlet bore, relative to a central longitudinal axis of the first plate;
a second plate defining (i) a second inlet bore that is a second outer inlet bore, (ii) a second outlet bore that is a second outer outlet bore, (iii) a second inner inlet bore, and (iv) a second inner outlet bore, relative to a central longitudinal axis of the second plate;
a drum disposed between and rotatably engaged with the first plate and the second plate, the drum defining (i) a dosing bore that is an outer dosing bore and (ii) an inner dosing bore, relative to a central longitudinal axis of the drum;
a slider slidably disposed in the dosing bore; and
a motor drivably engaged with the drum,
wherein the central longitudinal axis of the first plate, the central longitudinal axis of the second plate, and the central longitudinal axis of the drum is each collinear with an axis of rotation of the drum.

17. The fluid dispensing apparatus of claim 16, wherein the first and second plates are configured to be substantially stationary relative to one another.

18. The fluid dispensing apparatus of claim 16, wherein the motor is configured to
rotate the drum in a first direction from a first dispensing position to a second dispensing position, and
further rotate the drum in the first direction from the second dispensing position back to the first dispensing position,
the dosing bore is aligned with the first inlet and the first outlet when the drum is in the first dispensing position, and
the dosing bore is aligned with the second inlet and the second outlet when the drum is in the second dispensing position.

19. A fluid dispensing system, comprising
a first plate defining (i) a first inlet bore that is a first outer inlet bore, (ii) a first outlet bore that is a first outer outlet bore, (iii) a first inner inlet bore, and (iv) a first inner outlet bore, relative to a central longitudinal axis of the first plate;
a second plate defining (i) a second inlet bore that is a second outer inlet bore, and (ii) a second outlet bore that is a second outer outlet bore, (iii) a second inner inlet bore, and (iv) a second inner outlet bore, relative to a central longitudinal axis of the second plate;
a drum disposed between and rotatably engaged with the first plate and the second plate, the drum defining (i) a dosing bore that is an outer dosing bore and (ii) an inner dosing bore, relative to a central longitudinal axis of the drum;
a slider slidably disposed in the dosing bore;
a motor drivably engaged with the drum; and
a reservoir in fluid communication with the first inlet and the second inlet,
wherein the central longitudinal axis of the first plate, the central longitudinal axis of the second plate, and the central longitudinal axis of the drum is each collinear with an axis of rotation of the drum.

20. The fluid dispensing system of claim 19, wherein:
when the drum is in a first dispensing position, the slider limits a first fluid flow traveling from the reservoir through the first inlet toward the first outlet, and
when the drum is in a second dispensing position, the slider limits a second fluid flow traveling from the reservoir through the second inlet toward the second outlet.

* * * * *